United States Patent
Bultemeier

(10) Patent No.: US 11,383,842 B2
(45) Date of Patent: Jul. 12, 2022

(54) VENTILATED VEHICLE SEAT SYSTEMS AND METHODS

(71) Applicant: THE BOEING COMPANY, Chicago, IL (US)

(72) Inventor: Eric J. Bultemeier, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 355 days.

(21) Appl. No.: 16/657,339

(22) Filed: Oct. 18, 2019

(65) Prior Publication Data
US 2021/0114734 A1    Apr. 22, 2021

(51) Int. Cl.
| B60N 2/60 | (2006.01) |
| A47C 31/10 | (2006.01) |
| B60N 2/56 | (2006.01) |
| B64D 11/06 | (2006.01) |

(52) U.S. Cl.
CPC ........ *B64D 11/0626* (2014.12); *B60N 2/5657* (2013.01)

(58) Field of Classification Search
CPC ..... B64D 11/0626; B60N 2/5657; B60N 2/56
See application file for complete search history.

(56) References Cited

U.S. PATENT DOCUMENTS

| 4,072,344 A * | 2/1978 | Li | A47C 21/046 |
| | | | 297/180.1 |
| 4,175,297 A * | 11/1979 | Robbins | A61G 7/05776 |
| | | | 5/284 |
| 5,160,517 A | 10/1992 | Hicks et al. | |
| 6,079,485 A * | 6/2000 | Esaki | B60H 1/00285 |
| | | | 165/42 |
| 6,505,886 B2 * | 1/2003 | Gielda | A47C 7/74 |
| | | | 297/180.1 |
| 6,857,697 B2 * | 2/2005 | Brennan | A47C 7/74 |
| | | | 297/180.12 |
| 7,419,214 B2 | 9/2008 | Plant | |
| 7,871,038 B2 | 1/2011 | Space et al. | |
| 9,403,460 B2 * | 8/2016 | Hickey | B60N 2/5628 |
| 9,889,939 B2 | 2/2018 | Zhang et al. | |
| 10,029,797 B2 | 7/2018 | Space et al. | |
| 11,083,379 B2 * | 8/2021 | Perraut | A61B 5/4836 |
| 11,084,404 B2 * | 8/2021 | Gupta | B60N 2/5642 |
| 11,173,816 B2 * | 11/2021 | Zhang | B60N 2/5642 |
| 2003/0214160 A1 * | 11/2003 | Brennan | B60N 2/5657 |
| | | | 297/180.14 |

(Continued)

OTHER PUBLICATIONS https://katzkin.com/degreez.

*Primary Examiner* — Shin H Kim
(74) *Attorney, Agent, or Firm* — The Small Patent Law Group LLC; Joseph M. Butscher

(57) ABSTRACT

A seat assembly includes an external structure, at least one seating support surface, a valve, and at least one air distribution passageway. The external structure has a cavity therein. The at least one seating support surface is configured for contact with an occupant. The valve is disposed within the cavity and is in fluid communication with an external air supply. The at least one air distribution passageway is in fluid communication with the valve and is interposed between the valve and the at least one seating support surface. Air from the external air supply is directed to the seating support surface via the valve and the at least one passageway.

22 Claims, 5 Drawing Sheets

(56) References Cited

U.S. PATENT DOCUMENTS

| | | | |
|---|---|---|---|
| 2008/0290702 A1* | 11/2008 | Shin | B60N 2/5628 |
| | | | 297/180.13 |
| 2008/0296939 A1* | 12/2008 | Bajic | B60N 2/976 |
| | | | 297/180.1 |
| 2008/0308106 A1* | 12/2008 | Augustine | A47C 7/744 |
| | | | 128/205.29 |
| 2009/0218855 A1* | 9/2009 | Wolas | B60N 2/5657 |
| | | | 297/180.14 |
| 2010/0081369 A1 | 4/2010 | Space et al. | |
| 2012/0080911 A1* | 4/2012 | Brykalski | B60N 2/565 |
| | | | 297/180.15 |
| 2015/0008706 A1* | 1/2015 | Obadia | B64D 11/064 |
| | | | 297/188.08 |
| 2016/0107552 A1* | 4/2016 | Wakeman | A47C 31/10 |
| | | | 297/229 |
| 2017/0015226 A1* | 1/2017 | Wolas | B60N 2/5628 |
| 2018/0134193 A1* | 5/2018 | Yang | B60N 2/5642 |
| 2019/0100318 A1 | 4/2019 | Space et al. | |

\* cited by examiner

VENTILATED VEHICLE SEAT SYSTEMS AND METHODS

FIELD OF EMBODIMENTS OF THE DISCLOSURE

Embodiments of the present disclosure generally relate to systems and methods of providing ventilation via a seat, for example within a vehicle, such as a commercial aircraft.

BACKGROUND OF THE DISCLOSURE

An occupant of a seat may become uncomfortable due to environmental conditions. For example, during a flight, a pilot seat that is not heated, cooled, or otherwise ventilated may become uncomfortable. Further, it may be desirable to provide ventilation to an enclosed portion within a vehicle. For example, the cabin or flight deck of a commercial aircraft may be subject to standards requiring a prescribed amount of ventilation (e.g., for smoke clearance). However, current ventilation approaches may be noisy, further adding to discomfort of crew during a flight.

SUMMARY OF THE DISCLOSURE

A need exists for a system and method for improved ventilation of seats and/or environments surrounding seats, such as the cabin or flight deck of a vehicle.

With those needs in mind, certain embodiments of the present disclosure provide improved ventilation for seats, for example those in a vehicle such as a commercial aircraft. Various embodiments provide a seat assembly that receives air from an external source (e.g., via a duct in a floor) and pass the air through an interior portion of the seat assembly and out of the seat assembly through one or more outlets or paths. For example, air may be passed through a seating portion to provide heating or cooling to an occupant of the seat assembly. As another example, air may be passed through a by-pass outlet to help provide a desired airflow to an interior of the vehicle, with the passage through one or more aspects of the seat assembly helping to reduce noise. Accordingly, various embodiments provide efficient, reliable distribution of air through an interior of a vehicle.

Certain embodiments of the present disclosure provide a seat assembly that includes an external structure, at least one seating support surface, a valve, and at least one air distribution passageway. The external structure has a cavity therein. The at least one seating support surface is configured for contact with an occupant. The valve is disposed within the cavity and is in fluid communication with an external air supply. The at least one air distribution passageway is in fluid communication with the valve and is interposed between the valve and the at least one seating support surface. Air from the external air supply is directed to the seating support surface via the valve and the at least one passageway.

Certain embodiments of the present disclosure provide a vehicle that includes an air source, a floor, a duct, and a seat assembly. The duct is disposed beneath the floor and is coupled to the air source. The seat assembly is disposed on the floor and includes an external structure, at least one seating support surface, a valve, a flexible coupling, and at least one air distribution passageway. The seat assembly is disposed on the floor, and includes an external structure, at least one seating support surface, a valve, and a flexible coupling. The external structure has a cavity therein. The at least one seating support surface is configured for contact with an occupant. The valve is disposed within the cavity and in fluid communication with the air source. The flexible coupling is coupled to the valve and the duct, and is interposed between the valve and the duct, with the valve placed in fluid communication with the air source via the flexible coupling. The at least one air distribution passageway is in fluid communication with the valve and is interposed between the valve and the at least one seating support surface. Air from the air source is directed to the seating support surface via the duct of the vehicle, the flexible coupling of the seat assembly, the valve of the seat assembly, and the at least one passageway of the seat assembly.

Certain embodiments of the present disclosure provide a method that includes distributing air through a duct disposed beneath a floor. The method also includes directing the air from the duct to valve disposed within an internal cavity of a seat assembly via a flexible coupling that couples the valve to the duct. Further, the method includes directing the air from the valve to at least one seating support surface via at least one air distribution passageway in fluid communication with the valve and interposed between the valve and the at least one seating support surface.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide ventilation through a seat from an air distribution system that is external and/or remote from the seat. Various embodiments provide a desired mass flow of air to occupants of seats and/or ventilation for smoke clearance and security for a portion of a vehicle, such as a flight deck. Various embodiments provide thermally controlled ventilation at a seat from an external air source providing greater design freedom relative to approaches that rely on a system of outlets. In various embodiments, a seat may act as a noise muffler and flow control device, providing a quiet supply of air to an enclosed space, such as a flight deck. Various embodiments provide plumbed, conditioned, filtered air that is passed through a seat to improve occupant comfort and convenience.

Figure 1:
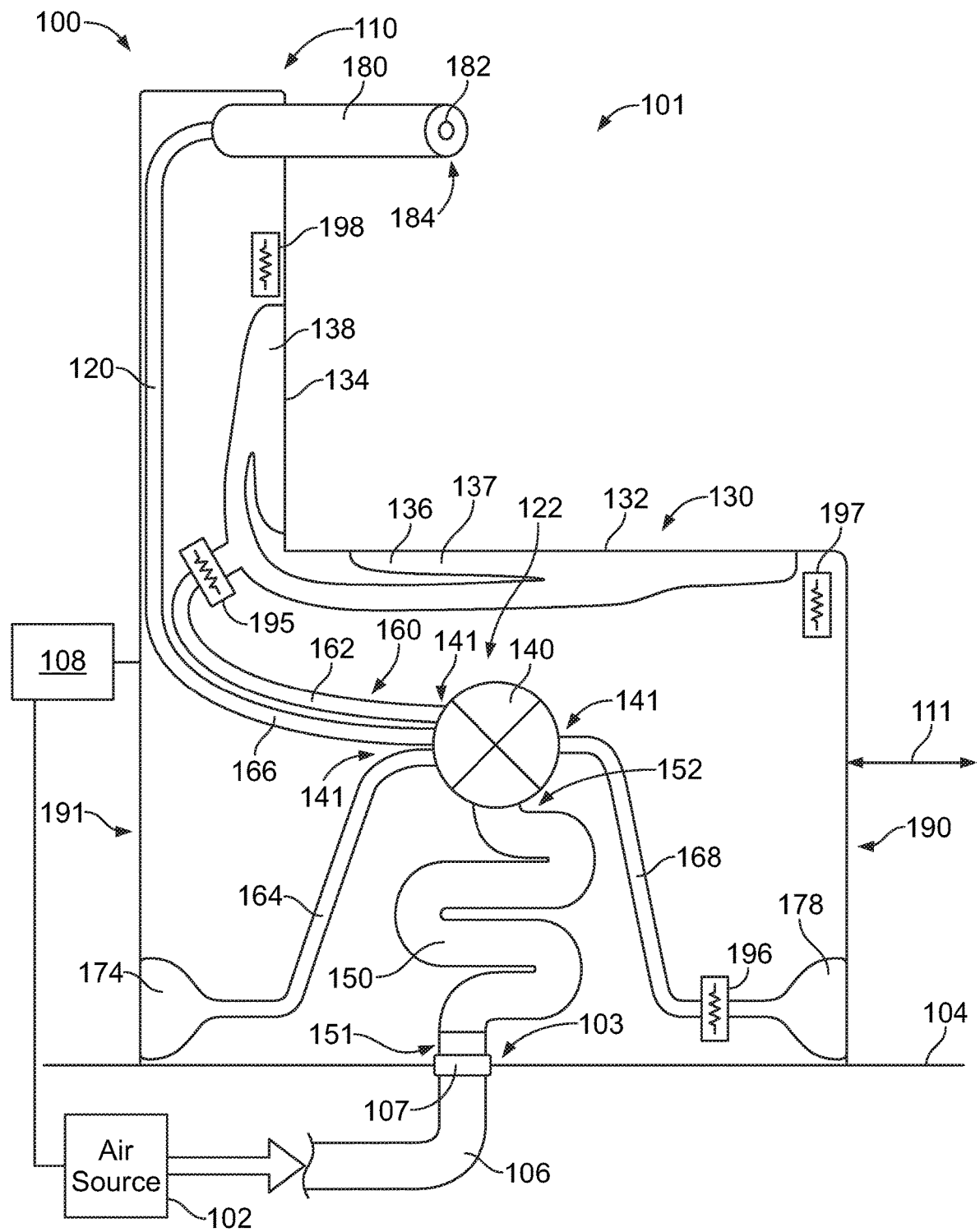
FIG. 1 is a schematic block diagram of an interior portion of a vehicle including a ventilated seat assembly, according to an embodiment of the present disclosure.
Figure 2:
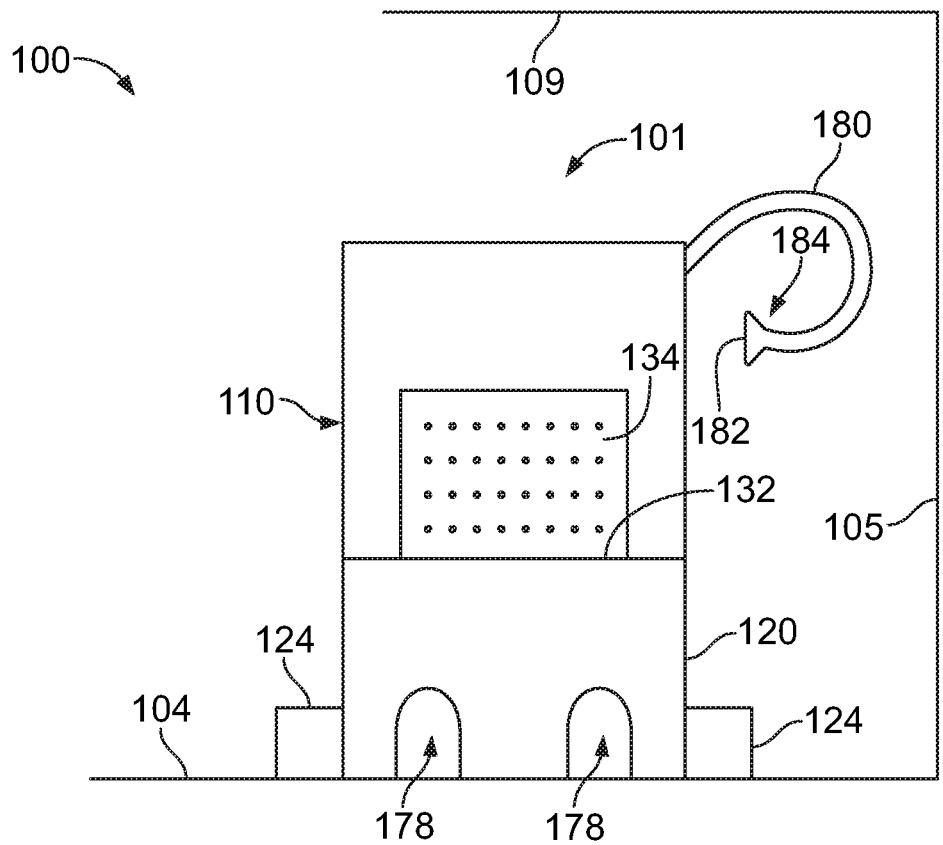
FIG. 2 depicts a front view of the interior portion of FIG. 1.
Figure 3:
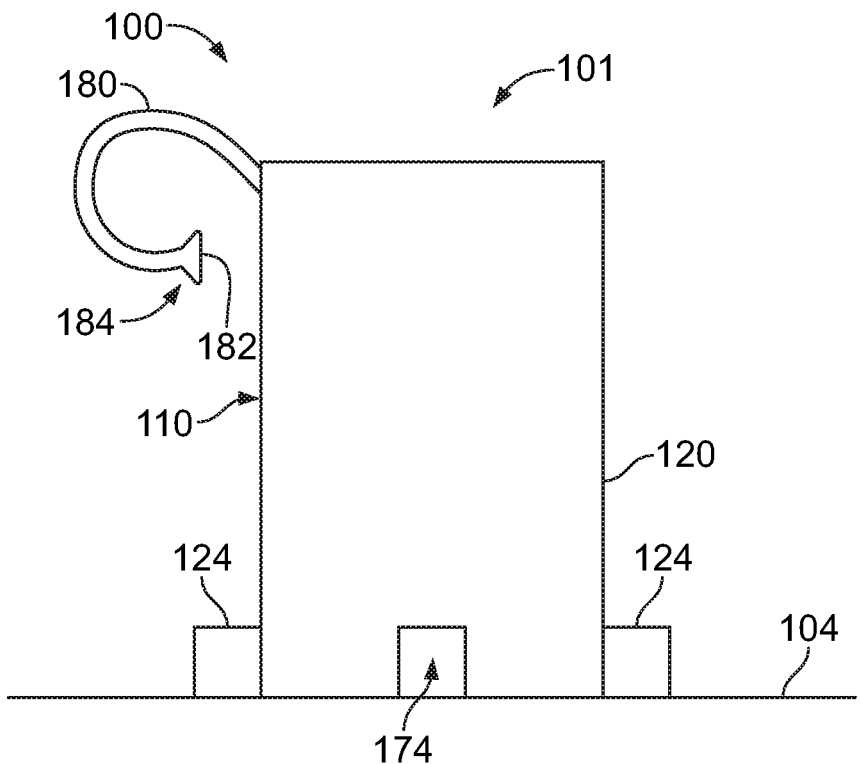
FIG. 3 depicts a rear view of the interior portion of FIG. 1.

FIG. 1 provides a schematic block sectional view of a portion of the interior of a vehicle 100 in accordance with various embodiments, while FIG. 2 provides a schematic front view of a portion of the interior of the vehicle 100, and FIG. 3 shows a schematic rear view of a portion of the interior of the vehicle 100. As seen in FIGS. 1-3, the depicted vehicle 100 includes an air source 102, a floor 104, a duct 106, and a seat assembly 110. In an example, the vehicle 100 is a commercial aircraft and the seat assembly 110 is disposed in a flight deck within the vehicle 100 and configured for use by a pilot, with the seat assembly being a pilot seat assembly. In another example, the vehicle 100 is a commercial aircraft and the seat assembly 110 is disposed in a cabin within the vehicle 100 and configured for use by a crew member, such as a flight attendant. It is noted that other vehicles and/or purposes for seating may be employed in various embodiments. For example, in some embodiments the vehicle 100 may be a ship. As another example, the seat assembly 110 may be configured for use by a passenger.

Generally, air (e.g., air produced for heating, cooling, and/or ventilation) from the air source 102 is provided to the seat assembly 110 via the duct 106. The air is then distributed from the interior of the seat assembly 110 in one or more directions outward from the seat assembly 110. For example, the air may be passed through a seating support portion of the seat assembly 110 to cool (or heat) an occupant of the seat assembly 110 (e.g., pilot, co-pilot, crew member, passenger), and/or passed through a by-pass outlet to divert flow out of the seat assembly 110 but not toward an occupant of the seat assembly. The depicted seat assembly 110 is disposed on the floor 104, and includes an external structure 120 that has a cavity 122 and a valve 140 that is disposed within the cavity 122 and is in fluid communication with the air source 102 to receive air from the air source. For example, in the illustrated example, the seat assembly 110 includes a flexible coupling 150 that is utilized to direct air from the duct 106 to the valve 140. The depicted flexible coupling 150 is interposed between the valve 140 and the duct 106, with the valve 140 placed in fluid communication with the air source 102 via the flexible coupling 150.

The depicted seat assembly 110 also includes at least one seating support surface 130 that is configured for contact with an occupant of the seat assembly 110 and at least one air distribution passageway 160. The air distribution passageway 160 is in fluid communication with the valve 140, and is interposed between the valve 140 and the at least one seating support surface 130. Air from the air source 102 is directed to the at least one seating support surface 130 via the duct 106 to the flexible coupling 150, then from the flexible coupling 150 to the valve 140, and then from the valve 140 to the at least one seating support surface 130 via the air distribution passageway 160. It is noted that FIG. 1 is arranged to show the inside or interior of the seat assembly 110.

The air source 102 is configured to supply or distribute air within an enclosed volume (e.g., cabin or flight deck) within the vehicle 100. The air source 102, for example, may include one or more of a pump, blower, or fan to direct air to the interior of the vehicle 100 via the duct 106, which is disposed beneath the floor 104 defining a lower boundary of an interior portion 101 (e.g., cabin or flight deck) of the vehicle 100. The air source 102 may also be configured to heat and/or cool the air distributed to the interior portion 101, and/or to modify a humidity level or other quality of the air, and/or to filter the air. The air source 102 may be located within a common interior location with the seat assembly 110, or may be located in a different portion of the vehicle 100.

The depicted duct 106 is disposed beneath the floor 104 and coupled to the air source 102. In some embodiments, the seat assembly 110 is a pilot seat assembly that is disposed in a flight deck (e.g., flight deck 690, see FIG. 6B) of the vehicle 100, and the duct 106 is a duct of an environment control system (ECS) of the vehicle 100. Air from the air source 102 is directed through the duct 106 to the seat assembly 110, and then through the seat assembly 110. Accordingly, air may be understood as being delivered to the atmosphere or interior portion 101 (e.g., cabin or flight deck) of the vehicle 100 indirectly from the duct 106 via the seat assembly 110. In the illustrated embodiment, the duct 106 is coupled to the flexible coupling via a joint 107 at an opening 103 in the floor 104. It is noted that ducts may additionally or alternatively be located in the wall 105 and/or ceiling 109 of the interior portion 101. For example, a duct may pass through a wall and be used to direct air into the interior of the seat assembly 110 from a side of the seat assembly 110. In addition to being provided indirectly via the seat assembly 110, air from ducts may also be provided directly into the interior portion 101 of the vehicle via vents or openings in one or more of the floor 104, wall 105, or ceiling 109 of the interior portion 101.

As discussed herein, the seat assembly 110 is configured to support an occupant while also distributing air from a ventilation system of the vehicle 100 to the environment surrounding the seat assembly 110. The air may be directed toward the occupant (e.g., as a cooling or heating flow) and/or may be by-passed through a route that directs the air away from the occupant (e.g., out of a rearward oriented surface of the seat assembly 110). Because the seat assembly 110 receives air from a ventilation system of the vehicle 100 (e.g., via duct 106), the seat assembly 110 in various embodiments is devoid of blowers or fans attached to an external surface of the seat assembly 110 and/or disposed within the seat assembly 110. In other embodiments, a supplemental blower or fan may be added to the external surface of the seat assembly 110 and/or within the seat assembly 110.

In various embodiments, the seat assembly 110 includes an external structure (e.g., external structure 120) having a cavity (e.g., cavity 122) defined therein. In the illustrated embodiment, the cavity 122 is generally disposed beneath a seating surface of the seat assembly 110. The cavity 122 is sized and configured to house the valve 140 and other components (e.g., heaters, hoses, support brackets) used to receive an air stream from an external air supply (e.g., the air source 102) and to redirect the air stream through the seat assembly 110 and to an environment (e.g., interior portion 101 of vehicle 100) surrounding the seat assembly 110. The external structure 120 is configured to provide structural support to the seat assembly 110 and may define a frame including legs, posts, beams, and/or other structural support members. The external structure 120 may be surrounded or enveloped by one or more panels and/or other coverings. In the illustrated embodiment, the floor 104 includes a track 124. The external structure 120 may include tabs, posts, wheels, guides, or other structures configured to cooperate with the track 124 to allow the seat assembly 110 to be movable along direction 111. In some examples, the track 124 is configured to cooperate with the track 124 to allow the seat assembly 110 to be movable along the direction 111, while the flexible coupling 150 is sized and configured to provide a volume of air to the valve 140 while having sufficient slack to allow the seat assembly 110 to be moved along the direction 111. It is noted that, while the track in the illustrated embodiment is shown in a single direction, in various embodiments the track may curve (e.g., for seat egress).

Further, the seat assembly 110 in various embodiments includes at least one seating support surface 130. The one or more seating support surfaces 130 is configured for contact with an occupant. Pads, cushions, or other support elements may be disposed beneath or behind the one or more seating support surfaces 130. The depicted example includes two seating support surfaces 130—a lower seating support surface 132 configured to be sat upon by an occupant, and a rear seating support surface 134 configured to contact and support the back of an occupant.

The depicted valve 140 is disposed within the cavity 122 and is in fluid communication with an external air supply (e.g., air source 102). It is noted that within examples the air supply is external with respect to the seat assembly 110 but is disposed within the vehicle 100 within which the depicted example seat assembly 110 is disposed. The external air supply may be disposed in or near (e.g., beneath) a room, cabin, or other enclosure in which the seat assembly 110 is disposed, or may be located remotely from the room, cabin, or other enclosure.

Generally, the valve 140 receives air from a source outside the seat assembly 110 and redistributes the air through one or more portions of the seat assembly 110. In the illustrated embodiment, the valve 140 is placed in fluid communication with an external air supply (e.g., air source 102) via the flexible coupling 150 that is joined to the duct 106 at the joint 107. The flexible coupling 150 has a fixed end 151 that is coupled to the joint 107 and secured in place, and a free end 152 that is coupled to valve 140 and free to move with the seat assembly 110 as it translates along direction 111. The flexible coupling 150 in various embodiments is configured as a hose or flexible tube having an internal passageway through which air may be directed from the duct 106 to the valve 140. The flexible coupling 150 is sized and configured to provide a sufficient volume of air while having enough slack to allow the seat assembly 110 to be moved along the direction 111 while receiving air from a fixed location (e.g., joint 107 where duct 106 penetrates the floor 104). Accordingly, the seat assembly 110 is allowed to translate while receiving air from a source or location that is fixed. Further, the flexible coupling 150 may be made of a material that helps to suppress noise from the distribution of air from the duct 106 to the environment surrounding the seat assembly 110. Alternatively or additionally, other aspects of the vehicle 100 such as the seat assembly 110 (e.g., an external covering, an internal structure) and/or the duct 106 may be made of or include a material that helps to suppress noise.

In various embodiments, the seat assembly includes at least one air distribution passageway (e.g., air distribution passageway 160). Generally the air distribution passageways are configured as hoses, tubes, pipes, ducting, or other structures having an internal passageway that directs air along a length of air distribution passageway. The depicted air distribution passageway 160 is in fluid communication with the valve 140 and at least one supporting surface (e.g., lower seating support surface 132 and/or rear seating support surface 134). Air from the external air supply (e.g., air source 102) is directed to the at least one seating support surface via the valve 140 and the air distribution passageway 160.

In various embodiments, a permeable or ventilated support structure is disposed proximate to (e.g., beneath or behind) the at least one supporting surface. For example, in the illustrated embodiment, the seat assembly 110 includes a ventilated support portion 136 disposed beneath the lower seating support surface 132 and behind the rear seating support surface 134, and a seating support air distribution passageway 162. The ventilated support portion 136 is permeable and configured to allow air to pass from the seating support air distribution passageway 162 to and through the seating support surfaces 132, 134. For example, the seating support surfaces 132, 134 may be made of a mesh or otherwise have openings through which air may pass. The ventilated support portion 136 may generally include a pad or other supportive material and also include one or more of cavities or tubes configured to direct air to the seating support surfaces 132. Additionally or alternatively, the ventilated support portion 136 may be formed as a woven structure, lattice, or other structure having openings through which air may pass toward the seating support surfaces 132, 134. In the illustrated embodiment, the ventilated support portion 136 includes a ventilated seat pan diffuser 137 and a ventilated back diffuser 138.

It is noted that additional air distribution passageways may be utilized additionally or alternatively in various embodiments. For example, the valve 140 in the illustrated embodiment is a multi-position valve having plural outlets 141, with each outlet 141 coupled to a corresponding air distribution passageway. The valve 140 may have a variety of settings allowing for all air to be directed through a selected outlet, or for air to be provided to 2 or more outlets at the same time. In the illustrated embodiment, in addition to the seating support air distribution passageway 162, the seat assembly 110 includes a by-pass passageway 164, a personal air distribution passageway 166, and a foot air distribution passageway 168. Use of plural passageways allows for improved occupant comfort and convenience as well as increased ventilation capacity.

The by-pass passageway 164 terminates in a by-pass outlet 174, and directs air from the valve 140 toward the by-pass outlet 174 and out of the seat assembly 110 via the by-pass outlet 174. The by-pass passageway 164 directs air away from an occupant of the seat assembly 110, allowing the seat assembly 110 to be used to provide ventilation to a surrounding atmosphere without directly affecting the occupant. For example, in the illustrated embodiment, an occupant of the seat is oriented toward a front 190 of the seat assembly 110, while the by-pass outlet 174 directs air out of a rear 191 of the seat assembly 110. For some vehicles, there may be a target ventilation capacity specified by a rule or standard. For example, commercial aircraft may be subject to minimum ventilation rules or standards for the flight deck or environment surrounding a pilot. The by-pass passageway 164 (and/or other passageways of the seat assembly 110) in various embodiments helps meet ventilation targets while reducing noise related to ventilation by allowing air to pass through the flexible coupling 150 and/or other portions of the seat assembly 110 that act as noise insulators. The by-pass passageway 164 in various embodiments is configured to meet a target flow to satisfy a ventilation standard (e.g., an amount of flow to provide a desired amount of smoke and/or contaminant clearance). For example, if an amount of air distributed through other portions of the seat assembly 110 does not satisfy the standard, an appropriate amount of additional air may be directed through the by-pass outlet 174 via the by-pass passageway 164.

The personal air distribution passageway 166 is configured to help provide an occupant in various embodiments with an adjustable supply of air that may be directed as desired by the occupant. For example, in the illustrated embodiment, the seat assembly 110 includes an arm 180. The arm 180 extends from the external structure 120. The depicted arm 180 extends at or around a head rest of the seat assembly 110 or at an elevation corresponding to an expected location of the head of the occupant. The arm 180 may be flexible or may be made of two or more sections that are articulable with respect to each other and/or the external structure 120 to allow for adjustment of position of a distal end 184 of the arm 180, to help direct air in a desired direction relative to the head or face of an occupant of the seat assembly 110, for example. The arm 180 has a personal air outlet 182 that is disposed proximate the distal end 184 of the arm 180. The personal air distribution passageway 166 terminates at the personal air outlet 182, and is used to direct air from the valve 140 and out of the seat assembly 110 via the personal air outlet 182. The personal air outlet 182 in various embodiments includes a valve or other assembly to control the flow of air out of the personal air outlet 182.

The foot air distribution passageway 168 is used to deliver a flow of air toward an occupant's feet. The depicted foot air distribution passageway 168 is in fluid communication with the valve 140 and terminates in at least one foot outlet 178 disposed proximate the floor 104 and the front 190 of the seat assembly. In the illustrated example, there are two foot outlets 178. Air from the valve 140 is directed through the foot air distribution passageway 168 and out of the seat assembly 110 via the foot outlets 178.

As discussed herein, the air directed toward the occupant of the seat assembly 110 may be heated or cooled to improve occupant comfort. In the illustrated embodiment, the seat assembly 110 includes various heaters to provide heat to an occupant of the seat assembly 110.

For example, in various embodiments, the seat assembly 110 at least one convective heater disposed along a corresponding air distribution passageway, with the at least one convective heater configured to heat air passing through the corresponding air distribution passageway, with the air subsequently directed toward the occupant and used to warm the occupant convectively. Convective heaters, for example, may use a resistive element to generate heat from a supplied electric current. In the illustrated example, the seat assembly includes a seat convective heater 195 disposed along the seating support air distribution passageway 162 that is configured to heat air passing through the seating support air distribution passageway 162, and a foot convective heater 196 configured to heat air passing through the foot air distribution passageway 168.

In various embodiments, the seat assembly 110 includes at least one conductive heater disposed proximate at least one seating support surface and configured to conductively heat the at least one seating support surface. Conductive heaters, for example, may use a resistive element to generate heat from a supplied electric current, with the heat provided to the occupant conductively via a seating support surface. In the illustrated example, the seat assembly 110 includes a seat conductive heater 197 disposed in or near a seat pan (e.g., proximate the ventilated seat pan diffuser 137), and a back conductive heater 198 disposed proximate the ventilated back diffuser 138.

The depicted seat assembly 110 also includes a control system 108. The control system 108 in various embodiments includes a power supply and controls, is operably coupled to various aspects of the seat assembly 110, and is used to control the operation of the seat assembly 110 to provide a desired ventilation level as well as to provide occupant comfort or convenience. For example, the control system 108 may send control signals to the valve 140 to direct a received air flow (e.g., air received from the duct 106) along one or more air distribution passageways. Additionally, control signals may be sent to one or more heaters to heat an air stream and/or a portion of the seat assembly 110 in contact with an occupant. Further, the control system 108 may be coupled to one or more sensors that sense a condition of the seat assembly 110 (e.g., temperature) and/or of the atmosphere surrounding the seat assembly 110. The control system 108 may further be coupled to one or more input devices configured to provide input from an occupant (e.g., an input requesting an increase or decrease in heating). It is noted that the control system 108 may be occupant controlled and/or automated in various embodiments. For example, an occupant may set an amount of ventilation that passes through outlets directed at or near the occupant, while the control system 108 autonomously determines an appropriate amount of air to be directed out of the by-pass outlet 174 to ensure a total ventilation flow target is met and controls the valve 140 to direct the appropriate amount of air through the by-pass passageway 164. The control system 108 in various embodiments includes one or more processors and a memory configured to store instruction for directing the operation of the control system 108. It is noted that the control system 108 in the illustrated embodiment is depicted as being a single unit disposed off-board of the seat assembly 110. However, in various embodiments, the control system 108 may be disposed on or inside the seat assembly 110. Further, in various embodiments, the control system 108 may be split or distributed among two or more units disposed remotely from the seat assembly 110, on the seat assembly 110, or within the seat assembly 110.

Accordingly, various embodiments allow for convenient cooling, heating, ventilation of a seat assembly, without the need for mounting blowers or other devices directly to the seat assembly (e.g., to an exterior of the seat assembly), increasing the convenience, capacity, and/or reliability of ventilation of the seat assembly. Further, various embodiments provide improved ventilation for an environment (e.g., cabin or flight deck) surrounding the seat, for example by reducing noise attributable to a desired ventilation level relative to air provided to the environment directly.

Figure 4:
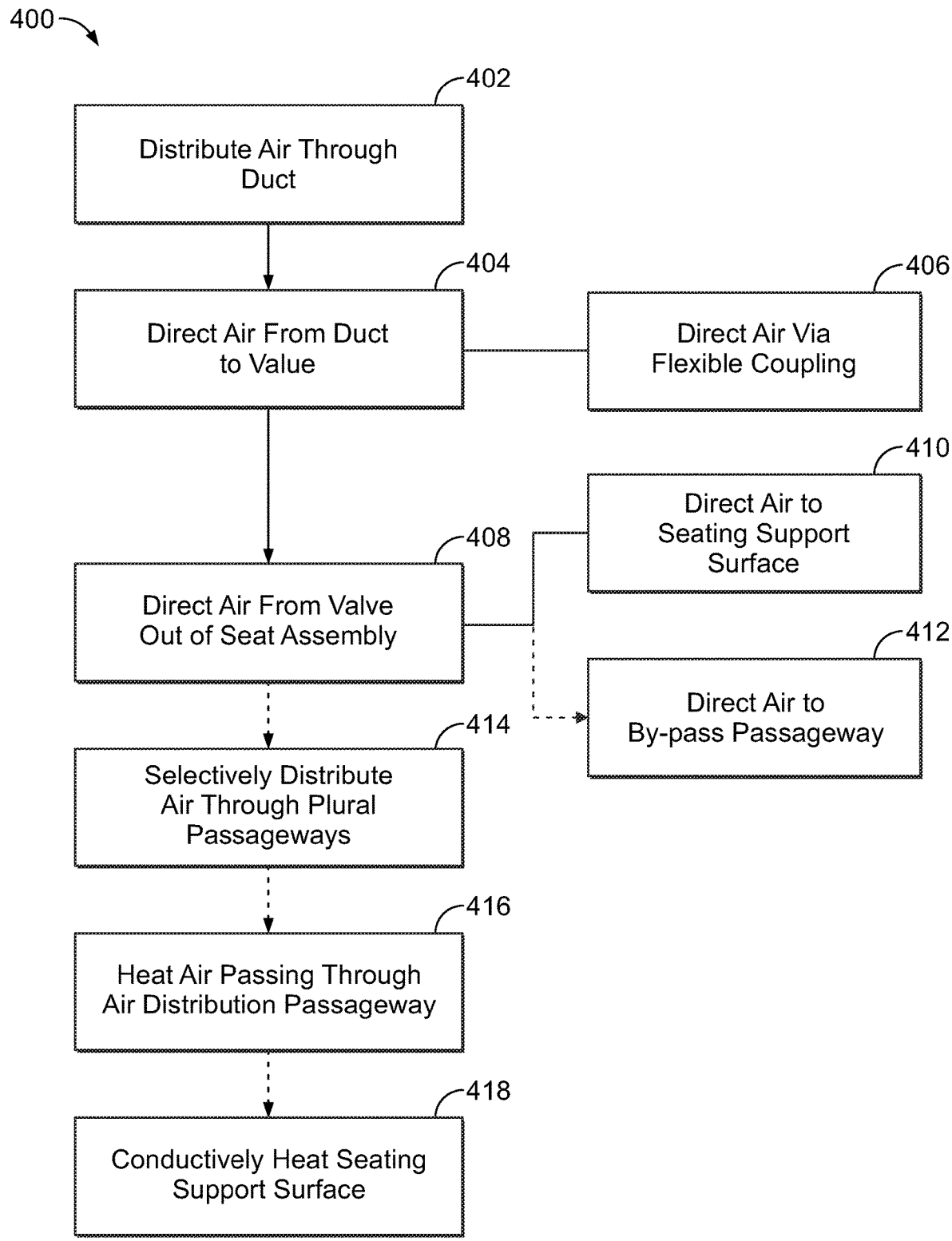
FIG. 4 is a flowchart of a method, according to an embodiment of the present disclosure.

FIG. 4 provides a flowchart of a method 400 (e.g., for ventilating a seat assembly and/or environment surrounding a seat assembly), in accordance with various embodiments. The method 400, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 400 may be able to be used as one or more algorithms to direct hardware (e.g., one or more aspects of the control system 108) to perform one or more operations described herein.

At 402, air is distributed through a duct (e.g., duct 106) disposed beneath a floor (e.g., floor 104). The floor, for example, may be the floor of an internal chamber of a vehicle (e.g., vehicle 100), such as the cabin of a commercial aircraft.

At 404, air is directed from the duct to a valve (e.g., valve 140) disposed within an internal cavity (e.g., cavity 122) of a seat assembly (e.g., seat assembly 110). In various embodiments, a flexible coupling is used to direct air to the valve. For example, in the illustrated embodiment, at 406, the air is directed to the valve from the duct via a flexible coupling (e.g., flexible coupling 150) that couples the valve to the duct. The flexible coupling allows the seat assembly to translate relative to the duct and/or reduces noise caused by air circulation from the duct.

At 408, air is directed from the valve out of the seat assembly via at least one air distribution passageway in fluid communication with the valve. For example, at 410 of illustrated example, air is directed from the valve to at least one seating support surface (e.g., seating support surfaces 132, 134) via at least one air distribution passageway (e.g., air distribution passageway 162) that is interposed between the valve and the at least one seating support surface. As another example, at 412, air from the valve is directed to a by-pass passageway (e.g., by-pass passageway 164) that terminates in a by-pass outlet (e.g., by-pass outlet 174). Alternatively or additionally, air may be directed from the valve through a personal air distribution passageway or a foot air distribution passageway (e.g., foot air distribution passageway 168).

In various embodiments, air may be provided via more than one air distribution passageway at the same time. For example, the valve may be a multi-position valve that has plural outlets, with each outlet coupled to a corresponding air distribution passageway. In the illustrated example at 414, air is selectively distributed through plural air distribution passageways via the valve.

As discussed herein, in various embodiments, heaters may be employed to warm an occupant of the seat assembly convectively and/or conductively. In the illustrated embodiment, at 416, air passing through at least one air distribution passageway is heated with a convective heater (e.g., heaters 195, 196). The convective heater is disposed along the at least one air distribution passageway. At 418 of the illustrated embodiment, the at least one seating support surface is conductively heated with at least one conductive heater (e.g., heaters 197, 198).

Figure 5:
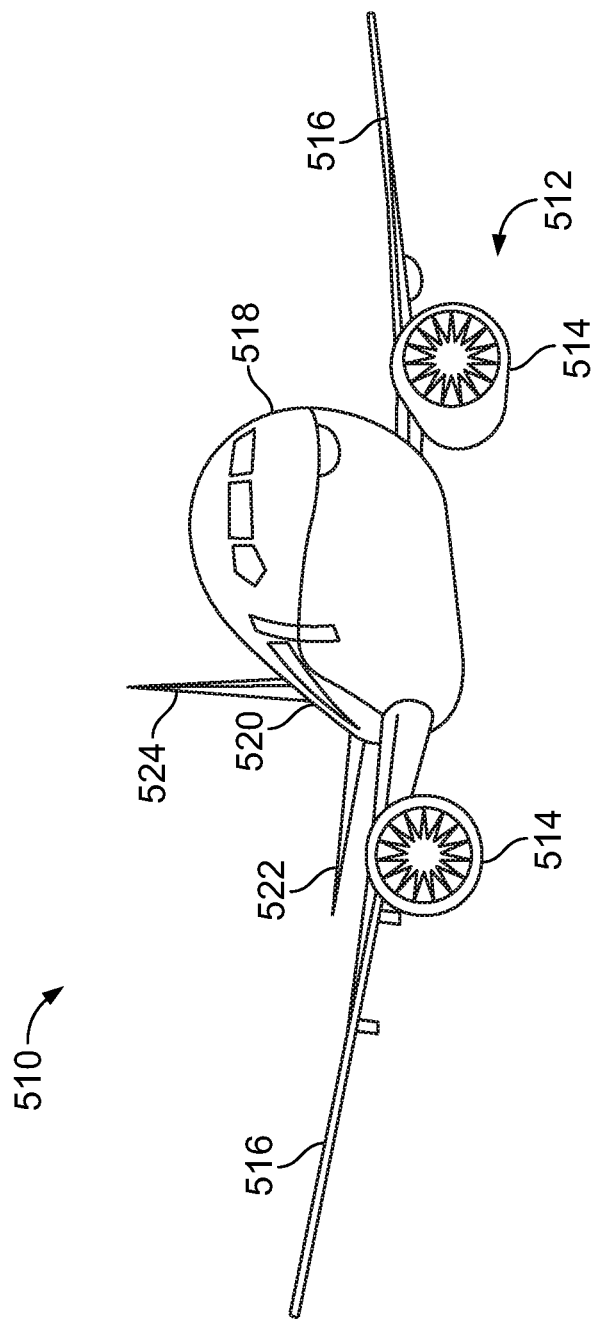
FIG. 5 is a diagrammatic representation of a front perspective view of an aircraft, according to an embodiment of the present disclosure.

The systems and/or method of the present disclosure may be used in connection with an aircraft. FIG. 5 is a diagrammatic representation of a front perspective view of a vehicle, such as an aircraft 510 (or aircraft assembly), according to an embodiment of the present disclosure. The aircraft 510 includes a propulsion system 512 that may include two turbofan engines 514, for example. Optionally, the propulsion system 512 may include more engines 514 than shown. The engines 514 are carried by wings 516 of the aircraft 510. In other embodiments, the engines 514 may be carried by a fuselage 518 and/or an empennage 520. The empennage 520 may also support horizontal stabilizers 522 and a vertical stabilizer 524.

The fuselage 518 of the aircraft 510 defines cockpit or flight deck, and an interior cabin, which may include one or more work sections (for example, galleys, personnel carry-on baggage areas, and the like), one or more passenger sections (for example, first class, business class, and economy sections), and an aft section. Each of the sections may be separated by a cabin transition area, which may include one or more class divider assemblies. Overhead stowage bin assemblies may be positioned throughout the interior cabin. In various embodiments, the aircraft 510 provides an example of the vehicle 100, and one or more aspects of the present disclosure may be disposed within the aircraft 510 (e.g., within the interior cabin or flight deck).

Figure 6A:
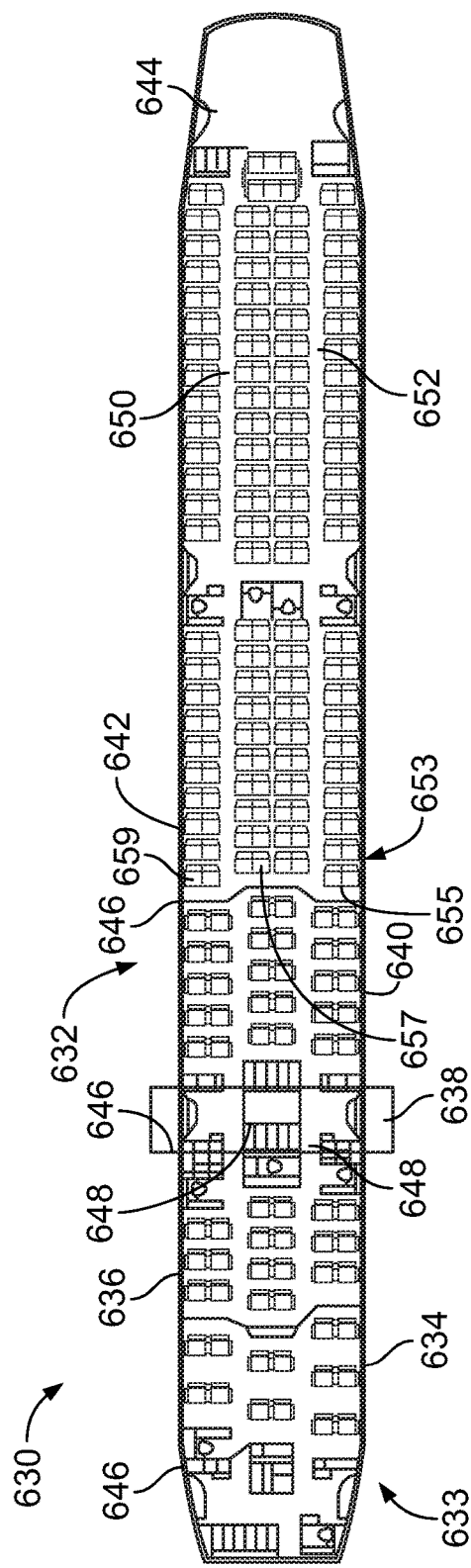
FIG. 6A is a diagrammatic representation of a top plan view of an interior cabin of an aircraft, according to an embodiment of the present disclosure.

FIG. 6A is a diagrammatic representation of a top plan view of an interior cabin 630 of an aircraft, according to an embodiment of the present disclosure. The interior cabin 630 is within a fuselage 632 of the aircraft 510 (shown in FIG. 5). For example, one or more fuselage wall members may define the interior cabin 630. The interior cabin 630 includes multiple sections or zones, including a front section 633, a first class section 634, a business class section 636, a front galley station 638, a business or an expanded economy or coach section 640, a standard economy or coach section 642, and an aft section 644, which may include multiple lavatories and galley stations. It is to be understood that the interior cabin 630 may include more or less sections and zones than shown. For example, the interior cabin 630 may not include a first class section, and may include more or less galley stations than shown. Each of the sections may be separated by a cabin transition area 646, which may include class divider assemblies between aisles 648.

As shown in FIG. 6A, the interior cabin 630 includes two aisles 650 and 652 that lead to the aft section 644. Optionally, the interior cabin 630 may have less or more aisles than shown. For example, the interior cabin 630 may include a single aisle that extends through the center of the interior cabin 630 that leads to the aft section 644.

As shown, rows 653 of seats are within the interior cabin 630. A row 653 spans across the interior cabin and generally extends across the aisles 650 and 652. Columns 655, 657, and 659 of seat sections are perpendicular to the rows 653. Each seat section may include one or more seats. The columns 655, 657, and 659 generally run parallel with the aisles 650 and 652. A particular section or zone may include any number of columns 655, 657, and 659 of seat sections. As shown in FIG. 6A, at least one zone includes three columns 655, 657, and 659 of seat sections. However, each zone may include more or less than three columns. For example, a first class section or zone may include two columns of seat sections.

Figure 6B:
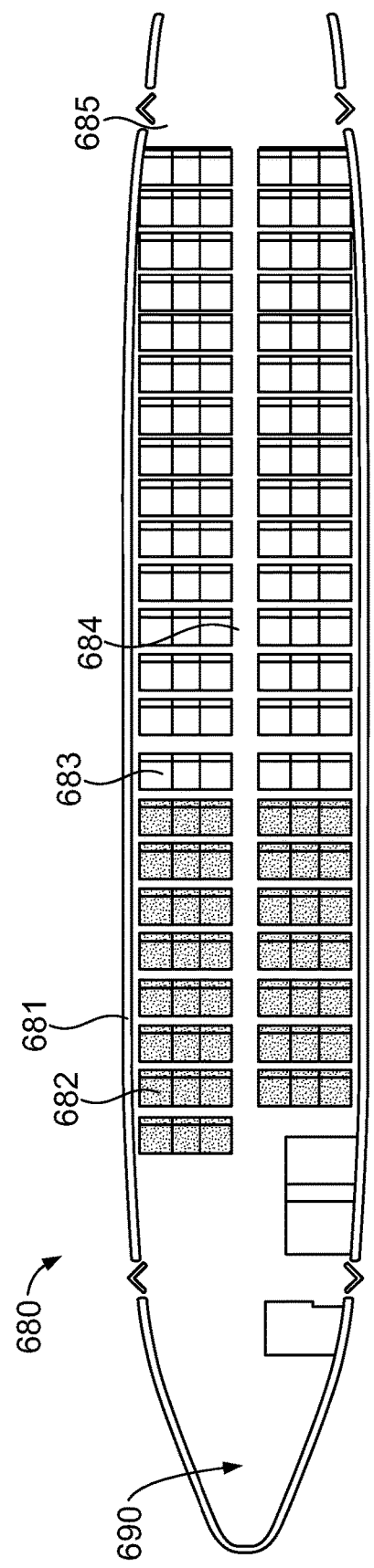
FIG. 6B is a diagrammatic representation of a top plan view of an interior cabin of an aircraft, according to an embodiment of the present disclosure.

FIG. 6B is a diagrammatic representation of a top plan view of an interior cabin 680 of an aircraft, according to an embodiment of the present disclosure. The interior cabin 680 is within a fuselage 681 of the aircraft. For example, one or more fuselage wall members may define the interior cabin 680. The interior cabin 680 includes multiple sections or zones, including a main cabin 682 having passenger seats 683, and an aft section 685 behind the main cabin 682. As seen in FIG. 6B, a flight deck 690 is defined within the fuselage 681 of the aircraft. It is to be understood that the interior cabin 680 may include more or less sections or zones than shown.

The interior cabin 680 may include a single aisle 684 that leads to the aft section 685. The single aisle 684 may extend through the center of the interior cabin 80 that leads to the aft section 685.

As used herein, the term "controller," "control unit," "processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For instance, in an example, the control system 108 is or includes one or more processors that are configured to control operations, as described above.

For example, the control system 108 may be configured to execute a set of instructions that are stored in one or more data storage units or elements, in order to process data. The data storage units may also store data or other information as desired or needed. The data storage units may be in the form of an information source or a physical memory element within a processing machine.

The set of instructions may include various commands that instruct the control system 108 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control system 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control system 108 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

As described herein, embodiments of the present disclosure provide systems and/or methods for improving ventilation of seats and/or environments surrounding seats. For example, various embodiments provide efficient and reliable distribution of air through an interior portion of a vehicle, such as the flight deck of a commercial aircraft. As another example, various embodiments provide for reduced noise caused by the distribution of air through an interior portion of a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly comprising:
   an external structure having a cavity therein;
   at least one seating support surface configured for contact with an occupant;
   a valve disposed within the cavity and in fluid communication with an external air supply; and at least one air distribution passageway in fluid communication with the valve and interposed between the valve and the at least one seating support surface, wherein the at least one air distribution passageway comprises a by-pass passageway terminating in a by-pass outlet, and wherein air from the external air supply is directed to the at least one seating support surface via the valve and the at least one air distribution passageway.

2. The seat assembly of claim 1 further comprising a flexible coupling coupled to the valve and interposed between the valve and the external air supply, the valve placed in fluid communication with the external air supply via the flexible coupling.

3. The seat assembly of claim 2, wherein the external structure is configured to cooperate with a track to allow the seat assembly to be movable along a direction, and the flexible coupling is sized and configured to provide a volume of air to the valve while having sufficient slack to allow the seat assembly to be moved along the direction.

4. The seat assembly of claim 3, wherein the seat assembly is a pilot seat assembly.

5. The seat assembly of claim 1, wherein the at least one air distribution passageway comprises plural air distribution passageways, and the valve is a multi-position valve having plural outlets each coupled to a corresponding air distribution passageway.

6. The seat assembly of claim 1 further comprising an arm extending from the external structure and having a personal air outlet disposed proximate a distal end of the arm, wherein the at least one air distribution passageway comprises a personal air distribution passageway terminating at the personal air outlet.

7. The seat assembly of claim 1, further comprising a ventilated support portion disposed proximate to at least a portion of the at least one seating support surface and a seating support air distribution passageway coupling the valve and the ventilated support portion.

8. The seat assembly of claim 1, further comprising at least one convective heater disposed along a corresponding air distribution passageway of the at least one air distribution passageway, the at least one convective heater configured to heat air passing through the corresponding air distribution passageway.

9. The seat assembly of claim 1, further comprising at least one conductive heater disposed proximate the seating support surface and configured to conductively heat a seating support surface of the at least one seating support surface.

10. The seat assembly of claim 1, further comprising a foot air distribution passageway in fluid communication with the valve and terminating in a foot outlet.

11. The seat assembly of claim 1, wherein the external structure has one or more structures configured to cooperate with a track to allow the seat assembly to move over and along the track.

12. The seat assembly of claim 1, wherein the external structure structurally supports the seat assembly.

13. A vehicle comprising:
an air source;
a floor;
a duct disposed beneath the floor and coupled to the air source; and
a seat assembly disposed on the floor, the seat assembly comprising:
an external structure having a cavity therein;
at least one seating support surface configured for contact with an occupant;
a valve disposed within the cavity and in fluid communication with the air source;
a flexible coupling coupled to the valve and the duct, the flexible coupling interposed between the valve and the duct, the valve placed in fluid communication with the air source via the flexible coupling; and
at least one air distribution passageway in fluid communication with the valve and interposed between the valve and the at least one seating support surface, wherein air from the air source is directed to the at least one seating support surface via the duct of the vehicle, the flexible coupling of the seat assembly, the valve of the seat assembly, and the at least one air distribution passageway of the seat assembly.

14. The vehicle of claim 13, wherein the at least one air distribution passageway comprises plural air distribution passageways, and the valve is a multi-position valve having plural outlets each coupled to a corresponding air distribution passageway.

15. The vehicle of claim 13, wherein the at least one air distribution passageway comprises a by-pass passageway terminating in a by-pass outlet.

16. The vehicle of claim 13, wherein the seat assembly is a pilot seat assembly disposed in a flight deck of the vehicle, and the duct is a duct of an environment control system (ECS) of the vehicle.

17. A method comprising:
distributing air through a duct disposed beneath a floor;
directing the air from the duct to valve disposed within an internal cavity of a seat assembly via a flexible coupling that couples the valve to the duct;
directing at least a portion of the air from the duct via the valve to a by-pass passageway terminating in a by-pass outlet; and
directing the air from the valve to at least one seating support surface via at least one air distribution passageway in fluid communication with the valve and interposed between the valve and the at least one seating support surface.

18. The method of claim 17, wherein the valve is a multi-position valve having plural outlets each coupled to a corresponding air distribution passageway, the method comprising selectively distributing air through the air distribution passageways via the valve.

19. The method of claim 17, further comprising heating air passing through at least one air distribution passageway with a convective heater disposed along the at least one air distribution passageway.

20. The method of claim 17, further comprising conductively heating the at least one seating support surface with at least one conductive heater.

21. The method of claim 17, further comprising structurally supporting the seat assembly with an external support having the internal cavity.

22. A seat assembly comprising:
an external structure having a cavity therein;
at least one seating support surface configured for contact with an occupant;
a multi-position valve disposed within the cavity and in fluid communication with an external air supply, wherein the multi-position valve has plural outlets; and
plural air distribution passageways in fluid communication with the valve and interposed between the valve and the at least one seating support surface, wherein the plural outlets are each coupled to a corresponding air distribution passageway, and wherein air from the external air supply is directed to the at least one seating support surface via the multi-position valve and the plural air distribution passageways.

* * * * *